(12) United States Patent
Masago et al.

(10) Patent No.: US 7,871,710 B2
(45) Date of Patent: Jan. 18, 2011

(54) CONDUCTIVE MATERIAL FOR A CONNECTING PART

(75) Inventors: Yasushi Masago, Shimonoseki (JP);
Ryoichi Ozaki, Shimonoseki (JP);
Hiroshi Sakamoto, Shimonoseki (JP);
Yukio Sugishita, Shimonoseki (JP)

(73) Assignee: Kobe Steel, Ltd., Kobe-shi (JP)

( * ) Notice: Subject to any disclaimer, the term of this patent is extended or adjusted under 35 U.S.C. 154(b) by 156 days.

(21) Appl. No.: 12/171,568

(22) Filed: Jul. 11, 2008

(65) Prior Publication Data

US 2009/0053553 A1 Feb. 26, 2009

(30) Foreign Application Priority Data

Aug. 24, 2007 (JP) ............................. 2007-218903

(51) Int. Cl.
*B32B 15/01* (2006.01)
*B05D 5/12* (2006.01)
*H01R 13/03* (2006.01)

(52) U.S. Cl. ........................ 428/647; 428/648; 428/675; 428/929; 439/887; 439/886

(58) Field of Classification Search ........................ None
See application file for complete search history.

(56) References Cited

U.S. PATENT DOCUMENTS 6,551,931 B1 * 4/2003 Edelstein et al. ............ 438/687
6,759,142 B2   7/2004 Hara et al.
6,784,088 B2 * 8/2004 Edelstein et al. ............ 438/612
2003/0091855 A1 * 5/2003 Tanaka et al. ............... 428/647

(Continued)

FOREIGN PATENT DOCUMENTS

CN          1455829 A      11/2003

(Continued)

OTHER PUBLICATIONS

U.S. Appl. No. 12/523,070, filed Jul. 14, 2009, Fugono, et al.

(Continued)

*Primary Examiner*—Jennifer C McNeil
*Assistant Examiner*—Jason L Savage
(74) *Attorney, Agent, or Firm*—Oblon, Spivak, McClelland, Maier & Neustadt, L.L.P.

(57) ABSTRACT

Disclosed is a conductive material for a connecting part, including: a base material made up of a Cu strip; a Cu—Sn alloy covering layer having an average thickness of 0.2 to 3.0 μm; and an Sn covering layer, the Cu—Sn alloy covering layer being provided between the base material and the Sn covering layer, wherein in a cross section perpendicular to the surface of the conductive material, the diameter [D1] of the minimum inscribed circle of the Sn covering layer is 0.2 μm or less, the diameter [D2] of the maximum inscribed circle of the Sn covering layer is 1.2 to 20 μm, the difference in elevation [y] between the outermost point of the material and the outermost point of the Cu—Sn alloy covering layer is 0.2 μm or less, and a bright or semi-bright tin electroplating layer having an average thickness of 0.01 μm or more in an approximately uniform thickness is formed on the outermost layer as part of the Sn covering layer.

13 Claims, 7 Drawing Sheets

U.S. PATENT DOCUMENTS

| | | | |
|---|---|---|---|
| 2004/0212089 A1* | 10/2004 | Edelstein et al. | 257/750 |
| 2005/0037229 A1* | 2/2005 | Tanaka | 428/647 |
| 2008/0090096 A1 | 4/2008 | Suzuki et al. | |
| 2008/0257581 A1* | 10/2008 | Masago et al. | 174/126.2 |

FOREIGN PATENT DOCUMENTS

| | | |
|---|---|---|
| CN | 1985333 A | 6/2007 |
| GB | 2 381 963 A | 5/2003 |
| JP | 10-60666 | 3/1998 |
| JP | 11-135226 | 5/1999 |
| JP | 2002-226982 | 8/2002 |
| JP | 2002-298963 | 10/2002 |
| JP | 2003-151668 | 5/2003 |
| JP | 2004-68026 | 3/2004 |
| JP | 2006-77307 | 3/2006 |
| JP | 2006-183068 | 7/2006 |

OTHER PUBLICATIONS

U.S. Appl. No. 12/712,494, filed Feb. 25, 2010, Taira, et al.

* cited by examiner

CONDUCTIVE MATERIAL FOR A CONNECTING PART

BACKGROUND OF THE INVENTION

1. Field of the Invention

The present invention relates to a conductive material for a connecting part such as a connector terminal, bus bar, and so forth, used in electrical wiring mainly for automobiles, consumer equipment, and the like, and in particular, to a conductive material for a connecting part, of which reliability of electrical connection in applications as well as reduction in friction and wear upon insertion.

2. Description of Related Art

For the conductive material for a connecting part such as the connector terminal, bus bar, and so forth, used in electrical wiring for automobiles, consumer equipment, and the like, Cu or a Cu-alloy, with Sn plating applied thereto, (including an Sn-alloy plating such as solder plating and so forth) is used, except the case of an important electrical circuit requiring high reliability of electrical connection, against a low-level signal voltage and current. Sn plating has been in widespread use because it is lower in cost in comparison with Au plating, and any other means for surface treatment. Among others, Sn plating containing no Pb from a standpoint of coping with recent regulations against material causing environmental impacts, and particularly, reflow Sn coating, and hot dip Sn coating, on which there have hardly been reported a case of short circuit trouble due to occurrence of whiskers, are now in the mainstream.

As a leap forward development has recently been made in electronics rapid progress has been seen in higher use of electrical equipment in, for example, automobiles, in an attempt to pursue safety, environmental friendliness, and driving comfort. As a result, there occurs an increase in the number of circuits, weight thereof, and so forth, leading to an increase in space occupied, and energy consumption, so that there arise requirements for a conductive material for a connecting part capable of providing a satisfactory performance required of the connecting part such as a terminal, bus bar and so forth even in the case of a multi-way connector, further reduction in size as well as weight, and a connecting part mounted in an engine room.

The Sn plating is applied to the conductive material for the connecting part mainly for the purpose of providing a surface thereof with corrosion resistance while obtaining a low contact resistance at electrical contacts and junctions and securing solderability when the conductive materials for the connecting parts are joined together by soldering. An Sn plating is a very soft conductive film, and an oxidized surface film thereof is prone to fracture. Accordingly, in the case of a fitting type terminal made up of a male form terminal in combination with a female form terminal, electrical contacts, such as indents, ribs, and so forth, tend to easily form gas tight contact due to adhesion occurring between the plating layers to be thereby rendered suitable for obtaining a low contact resistance. Further, in order to maintain the low contact resistance in applications, an Sn plating is preferably larger in thickness, and it is important to increase a contact pressure at which the electrical contacts are pressed against each other.

However, if the Sn plating is rendered larger in thickness, and the contact pressure at which the electrical contacts are pressed against each other is increased, this will cause an increase in a contact area between the Sn plating layers, and an increase in an adhesion force therebetween, so that there occurs an increase in a deformation resistance due to the Sn plating layer being turned up at the time of insertion of the terminal, and an increase in a shearing resistance for shearing adhesion, thereby resulting in an increase in an insertion force. A fitting type connecting part large in insertion force will cause poor efficiency of assembling work, and deterioration in electrical connection due to wrong fitting. Accordingly, there is a demand for terminals low in insertion force so that the total insertion force thereof does not become greater than that in the past even if the number of poles is increased.

Further, in the case of a small-sized Sn plated terminal, and so forth, with a reduced contact pressure under which electrical contacts are pressed against each other, for the purpose of reducing the insertion force thereof, and wear occurring thereto at the time of insertion of the terminal, and pull-out thereof, not only it becomes difficult to maintain a low contact resistance in subsequent applications but also the electrical contacts are caused to undergo slight sliding due to vibration, thermal expansion/contraction, and so forth, during applications, so that the small-sized Sn plating terminal will be susceptible to occurrence of a slight-sliding wear phenomenon causing an abnormal increase in contact resistance. It is presumed that the slight-sliding wear phenomenon is induced by wear occurring to the Sn plating layers at electrical contacts, due to the slight-sliding, and by deposition of a large amount of resultant Sn oxide between the electrical contacts, due to repetition of the slight-sliding. For reasons described as above, there is a demand for a terminal low in the insertion force, excellent in resistance to wear upon insertion thereof, and pull-out thereof as well as resistance to wear due to the slight-sliding so as to be capable of maintaining a low contact resistance in spite of an increase in the number of actions for the insertion and pull-out, and the slight-sliding occurring to the Sn plating layers at electrical contacts.

More and more connector terminals, bus bars and other automotive parts are mounted inside engine rooms at high temperatures to meet the demands for space savings, and their calorific values are also increased by the Joule heat because of an increase in the amount of current used. For these reasons, such parts are increasingly used in more harsh thermal environments. In Sn plated terminals, bus bars and like parts in which the thickness of a Sn covering layer formed is small for reducing insertion force and for other purposes, a thick layer of constituent elements other than Sn which causes thermal diffusion from materials and undercoat plating is formed as oxide by thermal influence, and contact resistance is increased since their electric resistances are high, whereby reliability of electrical connection is lost. In addition, Sn plated terminals, bus bars and the like may experience peeling of Sn plating by the thermal diffusion phenomenon, depending on the type of the base material made of Cu alloy, leading to a loss of reliability of electrical connection. Accordingly, connector terminals, bus bars and the like having small insertion force and excellent heat resistance in which low contact resistance can be maintained and peeling of Sn plating does not occur even in a harsh thermal environment are required.

Connector terminals, bus bars and like parts for automobiles are sometimes used in a harshly corrosive environment such as an exhaust gas atmosphere. In Sn plated terminals, bus bars and like parts in which the thickness of a Sn covering layer formed is made small for reducing insertion force and for other purposes, not only the Sn covering layer but also an undercoat covering layer and material constituent elements are thickly formed on the entire surface as a corrosion product by being retained in a corrosive environment for a long period of time. Since their electric resistances are high, their contact resistances are increased and therefore their reliability of electrical connection is lost. Accordingly, connector terminals, bus bars and like parts having low insertion force and excellent corrosion resistance in which low contact resistance can be maintained even when they are retained in a corrosive environment for a long period of time are required.

In addition, for connector terminals which are connected by soldering, joining using a solder containing no Pb (Pb-free solder joining) is increasingly used from a standpoint of coping with recent regulations against materials causing environmental impacts. The Pb-free solder has a higher melting point, lower solder wettability, and higher ability to dissolve connector terminals and the like than Sn—Pb-based solders which have been used in known solder joining. Therefore, ensuring joining reliability are sometimes difficult in conventional Sn plated terminals and the like. To ensure reliability in soldering joining with printed circuit boards and the like, it is important to form a plated layer as an undercoat or a thick Sn plated layer, but insertion force is increased at a mating portion of another connector terminal. Therefore, a connector terminal having low insertion force and excellent solderability is required.

Japanese Unexamined Patent Application Publication (JP-A) No. 2004-68026, JP-A-2003-151668, JP-A-2002-298963, JP-A-2002-226982, JP-A-11-135226 and JP-A-10-60666 describe materials for a fitting type terminal, wherein an Ni plating layer as an undercoat is formed on the surface of a base material composed of Cu or a Cu-alloy, and after forming a Cu plating layer, and an Sn plating layer in that order on the top of the Ni undercoat plating layer, a reflow process is applied thereto, thereby forming a Cu—Sn alloy covering layer. According to the description in these documents, the Cu—Sn alloy covering layer formed by the reflow process is harder as compared with the Ni plating layer, and the Cu plating layer, and owing to presence of the Cu—Sn alloy covering layer as an undercoat layer of the Sn covering layer remaining on the uppermost surface of the material, it is possible to decrease the insertion force of the terminal. Further, a low contact resistance can be maintained by the Sn covering layer present on the surface.

As the thickness of the Sn covering layer on the surface of the terminal becomes smaller, the insertion force of the terminal with the Cu—Sn alloy covering layer formed as the undercoat of the Sn covering layer is lowered. Further, the insertion force of the terminal with the Cu—Sn alloy covering layer formed on the surface thereof undergoes a further decrease. On the other hand, if the Sn covering layer becomes smaller in thickness, there will arise a problem that there occurs an increase in contact resistance of a terminal in the case where the terminal is held in a high-temperature environment reaching 150° C., for example, in an engine room of an automobile for many hours. Further, if the Sn covering layer is small in thickness, both corrosion resistance and solderability undergo deterioration. In addition, the Sn covering layer is susceptible to occurrence of the slight-sliding wear phenomenon. Thus, there have not been obtained as yet satisfactory properties required of conductive materials for connecting parts, such as a low insertion force, maintenance of a low contact resistance even in a corrosive environment or a vibrating environment after frequent insertions and pull-out of the terminal, and after the terminal being held in an high-temperature environment for many hours, excellent solderability and so forth, so that further improvements are required.

Meanwhile, JP-A-2006-77307 describes a conductive material for a connector part including a base material made up of a Cu strip, a Ni covering layer (including 0 μm), a Cu covering layer (including 0 μm), a Cu—Sn alloy covering layer and an Sn covering layer formed over a surface of the base material in the order stated, wherein a ratio of an exposed area of the Cu—Sn alloy covering layer to a surface of the material is 3 to 75% (desirably, an average surface material exposure interval in at least one direction is in a range of 0.01 to 0.5 mm), the Cu—Sn alloy covering layer having an average thickness is 0.1 to 3.0 μm and an amount of Cu contained of 20 to 70 at %, and the Sn covering layer having an average thickness of 0.2 to 5.0 μm. In the invention of JP-A-2006-77307, used is a base material in which an arithmetic mean roughness Ra of a surface of the base material, in at least one direction, is not less than 0.15 μm, and the arithmetic mean roughness Ra thereof, in all directions, is not more than 4.0 μm (desirably, an average interval between projections and depressions, in at least one direction, is 0.01 to 0.5 mm), and a Cu plating layer and an Sn plating layer are formed on the surface of the base material, or an Ni plating layer, a Cu plating layer and an Sn plating layer are formed, and then a reflow process is carried out.

JP-A-2006-183068 describes a conductive material for a connecting part, in which an Ni covering layer (including 0 μm), a Cu covering layer (including 0 μm), a Cu—Sn alloy covering layer and an Sn covering layer are formed in the order stated on the surface of a base material made up of a Cu strip, a ratio of an exposed area of the Cu—Sn alloy covering layer to a surface of the material is 3 to 75% (desirably, an average surface material exposure interval in at least one direction is in a range of 0.01 to 0.5 mm), an average thickness is 0.2 to 3.0 μm, an amount of Cu contained is 20 to 70 at %, the Sn covering layer has an average thickness of 0.2 to 5.0 μm, the surface of the material has an arithmetic mean roughness Ra of a surface of the base material, in at least one direction, is not less than 0.15 μm, and an arithmetic mean roughness Ra in all directions is 3.0 μm or less. In the invention of JP-A-2006-183068, used is a base material having an arithmetic mean roughness Ra in at least one direction of not less than 0.3 μm and an arithmetic mean roughness Ra thereof, in all directions, of not more than 4.0 μm (desirably, an average interval Sm between projections and depressions, in at least one direction of 0.01 to 0.5 mm), in which a Cu plating layer and an Sn plating layer are formed on the surface of the base material, or an Ni plating layer, a Cu plating layer and an Sn plating layer are formed, and then a reflow process is carried out.

The conductive materials for a connecting part described in JP-A-2006-77307 and JP-A-2006-183068, especially for use in the fitting type terminal, are capable of checking friction coefficient to a low level, and therefore an insertion force upon fitting a male terminal into a female terminal is low in the case where it is used for a multi-way connector, for example, in an automobile, so that assembling work can be efficiently carried out. Further, even after the material is held in a high-temperature environment for many hours, and in a corrosive environment, reliability of electrical connection (low contact resistance) can be maintained. In addition, in JP-A-2006-183068, it is possible to maintain reliability of electrical connection (low contact resistance) even in a vibrating environment. Furthermore, it can maintain excellent reliability of the electrical connection even when disposed in a spot for application at a very high temperature such as an engine room and the like.

SUMMARY OF THE INVENTION

The present invention was developed further from the inventions described in JP-A-2006-77307 and JP-A-2006-183068, and an object thereof is to provide a conductive material for a connecting part, including a base material made up of a Cu strip and an Ni covering layer (if necessary), a Cu covering layer (if necessary), a Cu—Sn alloy covering layer and an Sn covering layer formed on the surface of the base material, which has a low friction coefficient (small insertion force), maintains reliability of electrical connection (low contact resistance), and can impart solderability.

The conductive material for a connecting part according to one aspect of the present invention is a conductive material for a connecting part, including: a base material made up of a Cu strip; a Cu—Sn alloy covering layer having an average thickness of 0.2 to 3.0 μm; and an Sn covering layer, the Cu—Sn alloy covering layer being provided between the base material and the Sn covering layer, wherein in a cross section perpendicular to the surface of the conductive material, the diameter [D1] of the minimum inscribed circle of the Sn covering layer is 0.2 μm or less, the diameter [D2] of the maximum inscribed circle of the Sn covering layer is 1.2 to 20 μm, the difference in elevation [y] between the outermost point of the material and the outermost point of the Cu—Sn alloy covering layer is 0.2 μm or less, a bright or semi-bright tin electroplating layer having an approximately uniform thickness and an average thickness of 0.01 μm or more is formed on the outermost layer as a part of the Sn covering layer.

In the conductive material for a connecting part, the Sn covering layer is preferably constituted of a reflow Sn plated layer and the bright or semi-bright tin electroplating layer formed thereon.

In the conductive material for a connecting part, an Ni covering layer having an average thickness is 0.1 to 3.0 μm may be formed between the surface of the base material and the Cu—Sn alloy covering layer.

In the conductive material for a connecting part, a Cu covering layer having an average thickness of 0.01 to 1.0 μm may be formed between the Ni covering layer and the Cu—Sn alloy covering layer.

In the conductive material for a connecting part, a Cu covering layer having an average thickness of 0.01 to 1.0 μm may be formed between the surface of the base material and the Cu—Sn alloy covering layer.

The reflectance of the plated surface varies depending on the type of the Sn plated layer formed on the outermost layer. In other words, the type of the plated layer can be distinguished from the reflectance of the plated surface. The reflectance of the material which has undergone only the reflow process and has no bright or semi-bright tin electroplating layer on the outermost layer is about 70 to 85%; the reflectance when the bright tin electroplating layer is formed on the outermost layer is about 50 to 65%; the reflectance when the semi-bright tin electroplating layer is formed on the outermost layer is about 35 to lower than 50%; and the reflectance when a matt tin electroplating layer is formed on the outermost layer is about 10 to 30%. When the outermost layer is a matt plating, the reflectance is low. Therefore, in order to provide a reflectance as high as or similar to the reflow Sn plated layer, it is desirable to form a bright tin electroplating layer or a semi-bright tin electroplating layer on the reflow Sn plating layer, and it is more desirable to form a bright tin electroplating layer.

It should be noted that the reflectance shown herein was determined according to JIS Z 8741 by using a digital variable-angle gloss meter (UGV-5D) manufactured by Suga Test Instruments Co. Ltd. with an angle of incidence of 45°.

The diameter [D1] of the minimum inscribed circle of the Sn covering layer, the diameter [D2] of the maximum inscribed circle of the Sn covering layer and the difference in elevation [y] between the outermost point of the material and the outermost point of the Cu—Sn alloy covering layer are illustrated in FIG. 1. FIG. 1(a) schematically shows an expanded view of the vicinity of the surface of a cross section 1a of a material 1 shown in FIG. 1(b) (a cross section perpendicular to a surface 1b, or a cross section perpendicular to a neutral plane 2 (a plane passing through the center of the thickness of the plate) of the base material when the surface 1b is rough), and an Ni covering layer 4, a Cu covering layer 5, a Cu—Sn alloy covering layer 6 and an Sn covering layer 7 are formed on the surface of the base material 3.

[D1] is the diameter of the minimum inscribed circle which can be drawn between the surface of the material 1 and the Cu—Sn alloy covering layer 6; [D2] is the diameter of the maximum inscribed circle; and [y] is the difference between the height (height from the neutral plane 2) of the point 1A (the outermost point of the material 1) which is the furthermost point from the neutral plane 2 of the surface of the material 1 and the height (height from the neutral plane 2) of the point 6A which is the furthermost point from the neutral plane 2 of the surface of the Cu—Sn alloy covering layer 6 (the outermost point of the Cu—Sn alloy covering layer 6). It should be noted that when [D1] is 0 μm, it means that a portion of the Cu—Sn alloy covering layer 6 is formed in a manner of being exposed at the surface of the material 1, while [y] is 0 μm, a portion of the Cu—Sn alloy covering layer 6 is exposed at the surface of the material 1 and the outermost point of the Cu—Sn alloy covering layer 6 is the outermost point of the material 1. When the surface of the Sn covering layer 7 is flat, [D1] and [y] are equal.

In the aspect of the present invention, a bright or semi-bright tin electroplating layer having a uniform thickness is formed on the outermost layer as a part of the Sn covering layer. Therefore, [D1]>0 μm, and [y]>0 μm.

In FIG. 1, the average thickness of the Cu covering layer 5 may be 0 μm. In this case, the Ni covering layer 4, the Cu—Sn alloy covering layer 6 and Sn covering layer 7 are formed on the surface of the base material 3 in the order stated.

In FIG. 1, the average thickness of the Ni covering layer may be also 0 μm. In this case, the Cu covering layer, the Cu—Sn alloy covering layer 6 and Sn covering layer 7, or the Cu—Sn alloy covering layer 6 and Sn covering layer 7 are formed on the surface of the base material 3 in the order stated.

It should be noted that the above-mentioned covering layer constitution may be formed only on a particular cross section perpendicular to the surface of the material (for example, a cross section perpendicular to the rolling direction), or may be formed on all the perpendicular cross sections. Furthermore, the region in which the above-mentioned covering layer constitution is formed may entirely cover one or both faces of the base material 3, or may occupy only a portion of one or both faces thereof.

In the aspect of the present invention, the Cu strip includes a Cu alloy strip. Strip means a plate which is rolled in the form of a coil.

The Ni covering layer, Cu covering layer and Sn covering layer each includes Ni alloys, Cu alloys and Sn alloys, in addition to Ni, Cu and Sn metals. The Cu—Sn alloy covering layer is entirely or mostly constituted of at least one intermetallic compound phases selected from Cu—Sn binary system intermetallic compound phases such as $Cu_6Sn_5$ (η phase), $Cu_3Sn$ (ε phase) and $Cu_4Sn$ (δ phase), and Ni—Cu—Sn ternary system intermetallic compound phases, in which Ni in the Ni covering layer are diffused in these binary system intermetallic compound phases. The Cu—Sn alloy covering layer may contain a small amount of constituent elements of the base material and inevitable impurities such as C and O.

The conductive material for a connecting part according to the aspect of the present invention, especially for use in the fitting type terminal, is capable of checking friction coefficient to a low level, and therefore an insertion force upon fitting a male terminal into a female terminal is low in the case where it is used for a multi-way connector, for example, in an automobile, so that assembling work can be efficiently carried out. Moreover, compared with conventional materials in which the Cu—Sn alloy covering layer is exposed, the material of the aspect of the present invention can maintain reliability of electrical connection (low contact resistance), and can impart good solderability even when used for connector terminals in which joining is carried out by lead-free solder joining and the like. In particular, when the material contains the Ni covering layer, electrical reliability (low contact resistance) can be maintained even when it is disposed in a place at a very high temperature for a long period of time, such as an engine room, or in a corrosive environment, or in a vibrating environment, and good solderability can be maintained.

When the conductive material for a connecting part according to the aspect of the present invention is used as a fitting type terminal, it is preferably used for both male and female terminals, but it can be used only for one of the male and female terminals.

DETAILED DESCRIPTION OF THE PREFERRED EMBODIMENTS

Figure 1A:
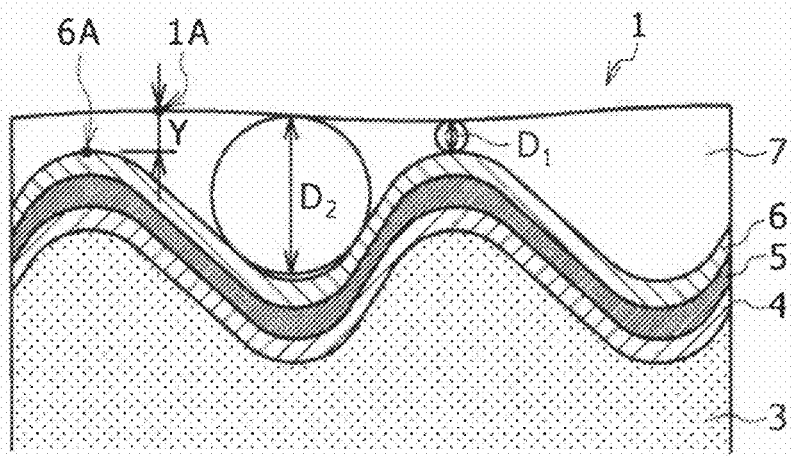
FIG. 1 is a drawing which schematically shows the structure of the covering layers appearing in a cross section perpendicular to the surface of the material show.

The conductive material for a connecting part according to the present invention will be described below in detail.

(1) The Ni covering layer inhibits the diffusion of constituent elements of the base material to the surface of the material and further inhibits the growth of the Cu—Sn alloy covering layer to prevent the consumption of the Sn covering layer. Therefore, an increase in contact resistance can be inhibited even after it is used at a high temperature for a long period of time, or even under a corrosive atmosphere of sulfurous acid gas, which helps to obtain good solder wettability. However, when the average thickness of the Ni covering layer is less than 0.1 µm, pit defects in the Ni covering layer are increased and other problems occur, whereby the above effects cannot be sufficiently produced. However, even when the average thickness of the Ni covering layer is less than 0.1 µm (including 0 µm), the effects of the present invention is not completely lost. In contrast, if the Ni covering layer becomes thick to a certain degree, the above effects are saturated, and if it is too thick, productivity and economical efficiencies are lowered. Therefore, the average thickness of the Ni covering layer is 3.0 µm or less (including 0 µm), and desirably 0.1 to 3.0 µm. The average thickness is more desirably 0.2 to 2.0 µm.

The Ni covering layer may contain a small amount of component elements and like substances contained in the base material. When the Ni covering layer is composed of an Ni alloy, examples of constituents of the Ni alloy other than Ni include Cu, P and Co, among others. The amount of Cu contained is desirably 40% by mass or less, and the amounts of P and Co contained are desirably 10% by mass or less.

When the Ni covering layer is formed, the Cu covering layer (Cu plating layer as an undercoat) may be formed between the base material and the Ni covering layer. The Cu plating as an undercoat is for improving the adhesion of the Ni plating by covering defects (pits, etc.), precipitates and other problems on the surface of the base material to increase the reliability of the Ni plating, and this Cu plating as an undercoat itself is a technique which has been conventionally performed. The thickness of the Cu covering layer is desirably 0.01 to 1 µm.

(2) Although the Cu covering layer is not essentially necessary, when the Ni covering layer is formed, it helps to effectively inhibit the diffusion of Ni in the Ni covering layer to the surface of the material and excessive diffusion to the Cu—Sn alloy covering layer. In particular, when the Sn covering layer is partially thin, which is the case in the present invention, the accumulation of Ni oxide whose electric resistance is very high on the surface of the material is inhibited even after it is used at a high temperature for a long period of time, whereby an increase in the contact resistance is effectively inhibited for a long period and corrosion resistance to sulfurous acid gas is also improved. However, when the Cu covering layer is too thick, inhibiting the growth of the Cu—Sn alloy covering layer is difficult, and thus the effect of preventing the consumption of the Sn covering layer is lowered. Moreover, if the Cu covering layer is too thick, a void is produced between the Cu covering layer and the Cu—Sn alloy covering layer due to thermal diffusion and aging, which lowers resistance to thermal peeling, productivity and economical efficiency. Therefore, the average thickness of the Cu covering layer is specified to 1.0 µm or less, and more desirably to 0.5 µm or less.

The Cu covering layer may contain a small amount of component elements and like substances contained in the base material and Ni in the Ni covering layer. Moreover, when the Cu covering layer is composed of a Cu alloy, examples of constituents of the Cn alloy other than Cn include Sn, Zn and the like. When Sn is contained, the amount is desirably less than 50% by mass, and in case of other elements, it is desirably less than 5% by mass.

(3) The Cu—Sn alloy covering layer is much harder than Sn or Sn alloys which form the Sn covering layer. Therefore, as in the present invention, when [D1] is 0.2 μm or less and [y] is 0.2 μm or less, it is possible to check a deformation resistance due to the Sn covering layer being turned up at the time of insertion of a terminal, and pull-out thereof, and a shearing resistance for shearing adhesion, thereby causing friction coefficient to be considerably lowered. Moreover, the hard Cu—Sn alloy covering layer is subjected to a contact pressure at the time of electrical contacts undergoing sliding/slight-sliding upon the insertion of the terminal, and pull-out thereof, or in a vibrating environment, thereby enabling a contact area between the Sn covering layers to be further reduced, so that wear and oxidation of the Sn covering layers are reduced, due to the slight-sliding. In addition, when the Ni covering layer is formed, the Cu—Sn alloy covering layer helps to inhibit the diffusion of Ni in the Ni covering layer to the surface of the material. However, when the average thickness of the Cu—Sn alloy covering layer is less than 0.2 μm, especially in case where the Sn covering layer is partially thin, which is the case in the present invention, there occurs an increase in the amount of Ni and so forth formed on the surface of the material, due to thermal diffusion such as high-temperature oxidation, and so forth, thereby rendering the material prone to an increase in contact resistance, and causing the corrosion resistance to deteriorate so that it becomes difficult to maintain the reliability of electrical connection. On the other hand, if the average thickness of the Cu—Sn alloy covering layer exceeds 3.0 μm, this will lower productivity and cost effectiveness. Accordingly, the average thickness of the Cu—Sn alloy covering layer is specified to 0.2 to 3.0 μm, and more preferably to 0.3 to 2.0 μm.

(4) The Sn covering layer covers the surface of the above Cu—Sn alloy covering layer, and functions to maintain reliability of electrical connection (mainly heat resistance and corrosion resistance) and good solderability.

When the diameter [D1] of the minimum inscribed circle of the Sn covering layer (refer to FIG. 1) is more than 0.2 μm, deformation resistance due to the Sn covering layer being turned up at the time of insertion of a terminal, and pull-out thereof and a shearing resistance for shearing adhesion are increased, which makes checking the friction coefficient to a low level difficult and also makes inhibiting an increase in contact resistance difficult because wear and oxidation of the Sn covering layers due to the slight-sliding are increased. Therefore, [D1] is specified to 0.2 μm or less, and more desirably 0.15 μm or less.

(5) When the diameter [D2] of the maximum inscribed circle of the Sn covering layer (refer to FIG. 1) is less than 1.2 μm, consumption of the Sn covering layer due to thermal diffusion, aging and other causes expedites the extinction of the Sn covering layer, and the effect in improving heat resistance and corrosion resistance is therefore lowered. Simultaneously, since the amount of the Sn covering layer is not high, it is difficult to ensure solder wettability. In contrast, when [D2] is more than 20 μm, mechanical properties are adversely affected in some cases, leading to lowered productivity and cost effectiveness. Therefore, [D2] is specified to 1.2 to 20 μm, and more desirably to 1.5 to 10 μm.

(6) When the difference in elevation [y] between the outermost point of the material and the outermost point of the Cu—Sn alloy covering layer (refer to FIG. 1) is more than 0.2 μm, deformation resistance due to the Sn covering layer being turned up at the time of insertion of a terminal and pull-out thereof and a shearing resistance for shearing adhesion are increased, which makes checking the friction coefficient to a low level difficult and also makes inhibiting an increase in contact resistance difficult because wear and oxidation of the Sn covering layers due to the slight-sliding are increased. Therefore, [y] is specified to 0.2 μm or less, and more desirably to 0.15 μm or less.

(7) A bright or semi-bright tin electroplating layer having a uniform thickness is formed on the outermost layer as a part of the Sn covering layer. Because of this bright or semi-bright tin electroplating layer, the Cu—Sn alloy covering layer is covered necessarily entirely by the Sn covering layer, whereby reliability of electrical connection and solderability are improved. The bright or semi-bright tin electroplating layer is formed on the outermost layer to form the Sn covering layer having a uniform thickness in the exposed portion of the Cu—Sn alloy layer. An attempt to control [D1] to be 0.01 to 0.2 μm by the reflow Sn plating causes portions where the Cu—Sn alloy covering layer is exposed and portions where [D1] is more than 0.2 μm since the shapes and heights of the projections of the material before being plated are not constant. Moreover, the structures of the reflow Sn plated layer and the outermost layer are changed, whereby diffusion in a high-temperature environment is inhibited, leading to an improvement in heat resistance reliability.

When the thickness of the bright or semi-bright Sn plating is less than 0.01 μm, the effect in improving solderability is lower than in the case where the Cu—Sn alloy layer is partly exposed even if the Cu—Sn alloy layer is covered. Moreover, when the [D1] is more than 0.2 μm, [D1] and [y] are inevitably more than 0.2 μm, deformation resistance due to the turning up at the time of insertion of a terminal and pull-out thereof and resistance for shearing adhesion are generated, leading to an increased coefficient of friction. Therefore, the thickness of the Sn covering layer on the outermost layer is desirably 0.01 μm or more, and is specified to 0.2 μm or less, and more desirably to 0.05 to 0.2 μm.

When the Sn covering layer is composed of an Sn alloy, Examples of constituents of the Sn alloy other than Sn include Pb, Bi, Zn, Ag, Cu and other elements. The amount of Pb contained is desirably less than 50% by mass, and the amounts of other elements contained are desirably less than 10% by mass.

The conductive material for a connecting part according to the present invention can be manufactured by subjecting the surface of the base material made up of a Cu strip to Ni plating, Cu plating and Sn plating in the order stated, performing a reflow process of the Sn plating, and then subjecting the surface to bright or semi-bright Sn plating. By the reflow process, a smoothened Sn covering layer is formed from the melt and flowing Sn plated layer, and the Cu—Sn alloy covering layer is formed from the Cu plating and Sn plating. In some cases, a portion of the Cu—Sn alloy covering layer is exposed at the surface, but the entire surface is uniformly covered by Sn plating carried out subsequently. Before the Ni plated layer is formed, the Cu plating layer as an undercoat may be formed on the surface of the base material.

When no Ni covering layer is necessary, the material can be produced by subjecting the surface of the base material made up of a Cu strip to Cu plating and Sn plating in the order stated, or performing only Sn plating without performing Cu plating, performing a reflow process of the Sn plating, and then subjecting the surface to bright or semi-bright Sn plating. By the reflow process, a smoothened Sn covering layer is formed from the melt and flowing Sn plated layer, and the Cu—Sn alloy covering layer is formed from the Cu plating and Sn plating or from the base material and the Sn plating. In some cases, a portion of the Cu—Sn alloy covering layer is exposed at the surface, but the entire surface is uniformly covered by Sn plating carried out subsequently.

It is desirable that in this manufacturing method, the roughness of the surface of the base material is as follows: the arithmetic mean roughness Ra in at least one direction is 0.4 μm or more; and the arithmetic mean roughness Ra in all directions is 4.0 μm or less. When Ra is less than 0.4 μm in any direction, it is difficult to satisfy the definition of claim 1 (especially [D2]) even by adjusting the thickness of plating and reflow conditions. When Ra is more than 4.0 μm, the melt flowability of Sn is lowered.

It is desirable that the average interval Sm between projections and depressions in said at least one direction is 0.01 to 0.5 mm. When Sm is less than 0.01 mm, it is difficult to satisfy the definition of claim 1 (especially [D2]) in some cases. When Sm is more than 0.5 mm, there can be a case where it is difficult to obtain a low friction coefficient, particularly when a small sized terminal is in use. It is further desirable that the maximum height Ry in said at least one direction is 2.0 to 20 μm. When Ry is outside this range, it is difficult to satisfy the definition of claim 1 (especially [D2]) in some cases.

A region in which the above-mentioned covering layer constitution is formed on the surface of the base material with the above-mentioned surface roughness may entirely cover one or both faces of the base material or may occupy only a portion of one or both faces thereof.

Examples of the methods for roughening the surface of the base material to obtain the above-mentioned surface roughness of the base material include physical methods such as ion etching, chemical methods such as etching and electrolytic polishing, and mechanical methods such as rolling (using work roll roughened by grinding, shot blast, etc.), grinding and shot blast. Among these, desirable methods which have excellent productivity, cost effectiveness and reproducibility of the form of the surface of the base material are rolling and grinding.

It is desirable that in plating before the reflow process, each plated layer is electrodeposited by reflecting the roughness of the surface of the base material (uniform electrodeposition property is high). This is for facilitating the control of the cross section form and surface form of the material specified in the present invention.

It is desirable that the reflow process is carried out at a temperature not lower than the melting point of the Sn plated layer but not higher than 600° C. for 3 to 30 seconds to cause the Sn plated layer to melt and flow. If the temperature is higher than 600° C., the amounts of elements diffused into the molten Sn are increased and the melt flowability of Sn is therefore lowered. Moreover, if the reflow process time is less than 3 seconds, melt flowability of Sn may be insufficient. If the reflow process time is more than 30 seconds, the amounts of elements diffused into the molten Sn are increased and the melt flowability of Sn is therefore lowered.

The Cu—Sn alloy covering layer is formed by the diffusion of Cu and Sn in the Cu plated layer and the Sn plated layer into each other by the reflow process. At this time, there are two possible cases: the case where the entire Cu plated layer disappears, and the case where a portion of the Cu plated layer remains. In case where all of the Cu plated layer disappears, Ni is sometimes provided from the Ni plated layer into the Cu—Sn alloy covering layer. When only the Sn plated layer is formed without forming the Cu plated layer on the surface of the base material, the Cu—Sn alloy covering layer is formed by the diffusion of Cu in the base material and Sn in the Sn plated layer into each other.

It is desirable that the average thickness of the Ni plated layer is desirably 0.1 to 3.0 μm; the average thickness of the Cu plated layer is 0.1 to 1.5 μm; and the average thickness of the Sn plated layer is 0.4 to 8.0 μm. When the average thickness of the Ni plated layer falls outside the above range, the average thickness of the Ni covering layer is likely to fall outside the desirable range of 0.1 to 3.0 μm. If the average thickness of the Cu plated layer is less than 0.1 μm, the amount of Ni diffused into the Cu—Sn alloy covering layer diffusion becomes too high, while if the average thickness of the Cu plated layer is more than 1.5 μm, the average thickness of the Cu covering layer is likely to fall outside the specified range. If the average thickness of the Sn plated layer falls outside the above range, it is likely that the requirement defined in claim 1 (especially D2) is not met.

In the present invention, the Ni plated layer, the Cu plated layer and the Sn plated layer (including Sn plating after the reflow process described later) each contains Ni alloys, Cu alloys and Sn alloys, in addition to Ni, Cu and Sn metals. In case of the latter, the alloys described earlier regarding the Ni covering layer, Cu covering layer and Sn covering layer can be used.

The conductive material for a connecting part according to the present invention is produced by further forming the Sn plated layer on the surface of the material after the reflow process which has undergone the steps mentioned above. This Sn plated layer is included in the Sn covering layer defined in claim 1 and others. Therefore, it is necessary that this Sn plated layer is formed to have a uniform thickness of 0.2 μm or less and that [D1] and [y] are not more than 0.2 μm.

Electroless plating, vapor deposition and other methods can be used for forming the Sn plated layer after the reflow process, but electroplating is desirable as a method which is excellent in productivity and cost effectiveness. Sn electroplating is categorized into matt plating, semi-bright plating, bright plating and other. Although any method can provide reliability of electrical connection and solderability improving effect, uniform electrodeposition property of plating film is inferior in matt plating, and therefore uneven appearance and reduced brightness occur. Accordingly, in view of appearance and brightness, semi-bright plating or bright plating is desirable, and bright plating is more desirable.

Sn plating on a copper strip after the reflow process may be performed in a line which is continuous with the production line where steps to the reflow process are performed or in a different line, but it is desirable to perform in the continuous production line considering productivity and cost effectiveness. By the time Sn plating is carried out, which is carried out continuously with reflow process, oxidation of the surface after the reflow process (especially oxidation of the Cu—Sn alloy layer exposed at the surface) proceeds, and the Sn plating may not be uniformly electrodeposited if the copper strip is not immersed into an aqueous solution of ammonium bifluoride before Sn plating (noticeable in semi-bright Sn plating). Also in terms of quality, it is desirable to perform Sn plating in the continuous line after the reflow process. The concentration of the aqueous solution of ammonium bifluoride is desirably adjusted to 0.5 to 10% by mass, and the immersion process is desirably carried out at a temperature of 20 to 50° C. for 20 seconds or less. When the concentration of the aqueous solution of ammonium bifluoride is lower than 0.5% by mass, removal of the oxide film on the surface may be difficult in some cases, while when the concentration is higher than 10% by mass, it dissolves the Sn covering layer. When the temperature of the aqueous solution of ammonium bifluoride is outside the above-specified range, removal of the oxide film on the surface is difficult, and when the immersion time is more than 20 seconds, it dissolves the Sn covering layer.

In general, semi-bright Sn plating can be carried out at room temperature and the plating bath needs not be cooled or heated, but bright Sn plating are often carried out at about 15° C., in which case the plating bath needs to be cooled. Since the Sn plating carried out before the reflow process is semi-bright Sn plating, a common plating bath tank can be used if Sn plating after the reflow process is semi-bright Sn plating, and the cooling equipment for the plating bath can be advantageously dispensed with. In contrast, if Sn plating after the reflow process is bright Sn plating, especially in such case where the material is produced in the continuous production line, the immersion process into the aqueous solution of ammonium bifluoride can be advantageously dispensed with.

In the production line, whether or not an Sn plated layer having a predetermined thickness is formed is normally determined by a fluorescent X-ray coating thickness gauge. Incidentally, the Sn plated layer and reflow Sn plated layer on the surface are both Sn layers, and thus it is difficult to determine the layers by the fluorescent X-ray coating thickness gauge by distinguishing the thickness of each Sn layer. Therefore, to form an Sn plated layer having a predetermined thickness in the continuous production line after a reflow plated layer having a predetermined thickness is formed, the plating conditions (concentration of plating solution, current density, temperature, etc) for applying a reflow plating having a predetermined thickness to a plated material, and the plating conditions for applying an Sn plating having a predetermined thickness to the plated material can be determined by the fluorescent X-ray coating thickness gauge in advance, and can be set as plating conditions in each step.

A cross-sectional structure of the conductive material for a connecting part according to the present invention is shown in FIG. 1, while schematic diagrams adjusted in accordance with the manufacturing method are shown in FIGS. 2 and 4 as examples. It should be understood that various forms are possible other than these cross-sectional shapes.

Figure 2A:
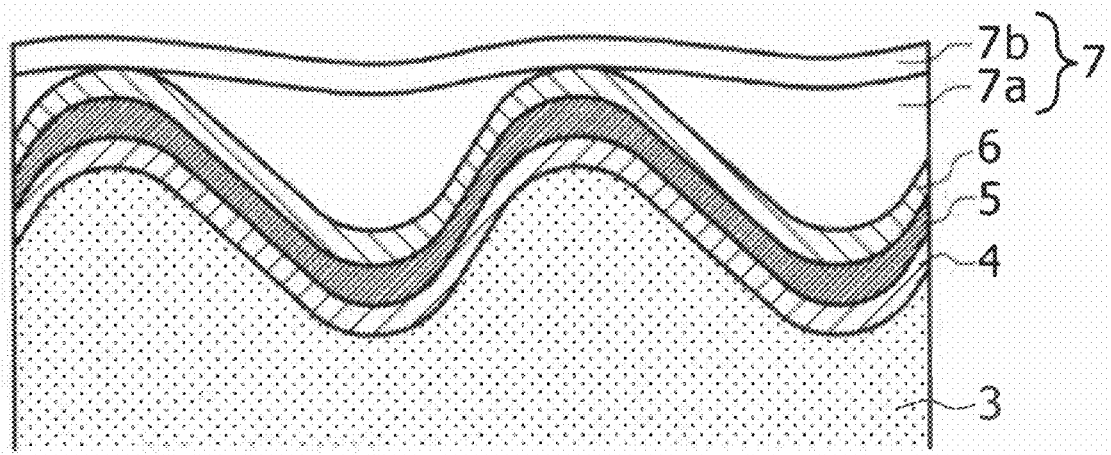
FIG. 2 is a drawing which schematically shows another structure of the covering layers appearing in a cross section perpendicular to the surface of the material.
Figure 2B:
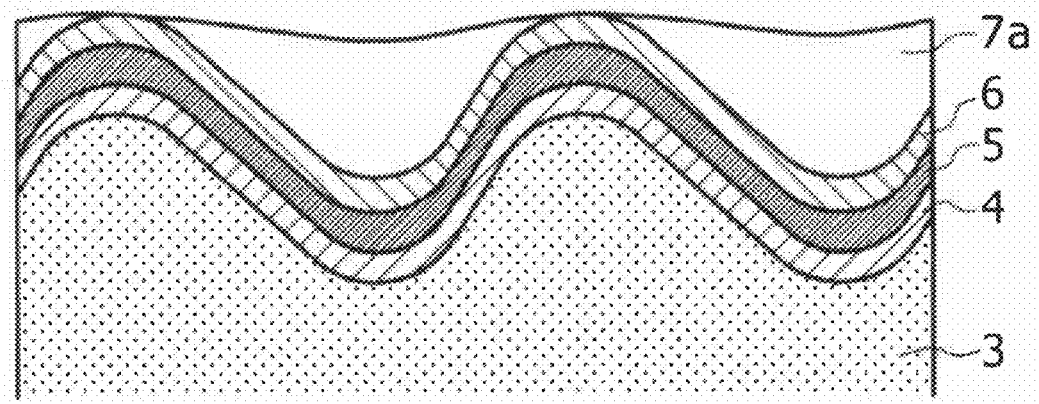

FIG. 2 is a conductive material which is prepared by subjecting the surface of the roughened surface of the base material 3 to Ni plating, Cu plating and Sn plating, performing a reflow process, and then subjecting to Sn plating. FIG. 2(b) is a cross sectional structure after the reflow process, and the Ni covering layer 4, Cu covering layer 5, Cu—Sn alloy covering layer 6 and reflow Sn plated layer 7a are formed. At this stage, a portion of the Cu—Sn alloy covering layer 6 is exposed at the surface of material, and both [D1] and [y] are 0. FIG. 2(a) is a cross sectional structure after Sn plating is consequently performed, in which the uniform Sn plated layer 7b is formed, and the Sn plated layer 7b constitutes the Sn covering layer 7 together with the reflow Sn plated layer 7a. [D1] and [y] are equal, and neither of them is zero.

Figure 3A:
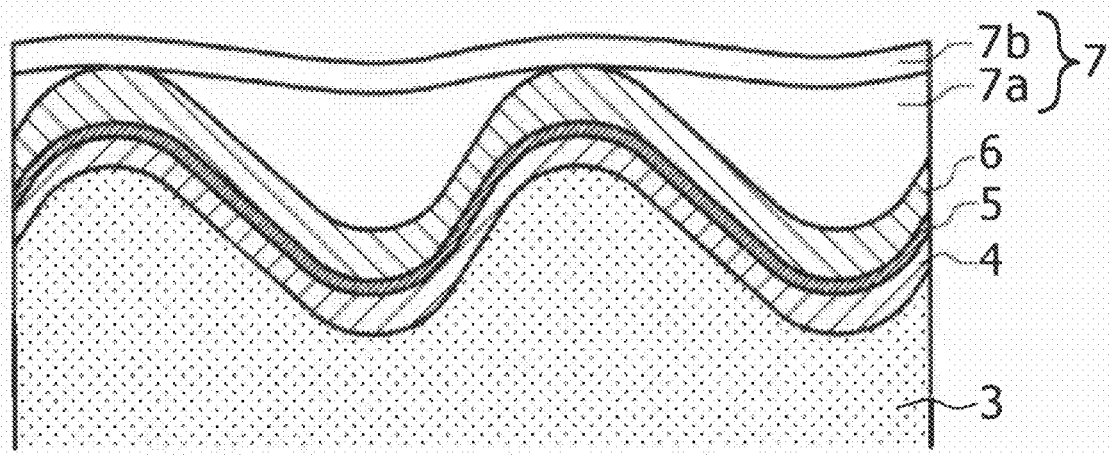
FIG. 3 is a drawing which schematically shows another structure of the covering layers appearing in a cross section perpendicular to the surface of the material.
Figure 3B:
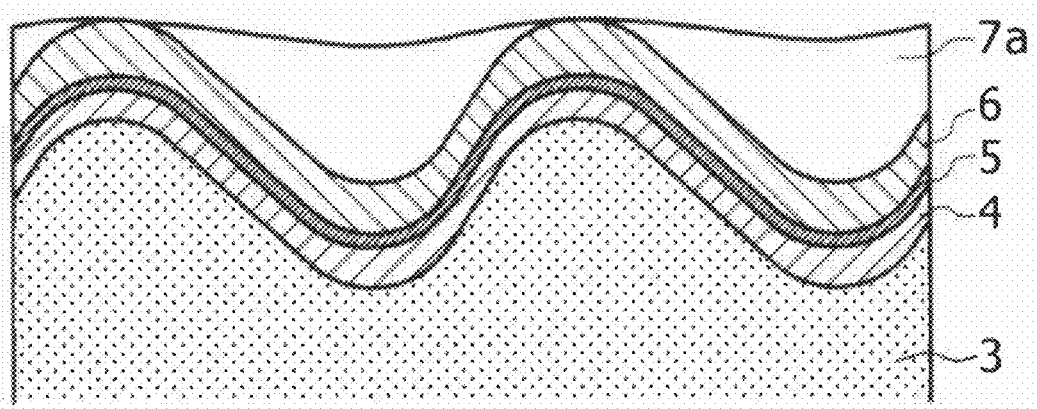

FIG. 3 is a conductive material which is produced by Ni plating, Cu plating and Sn plating the roughened surface of the base material 3, performing a reflow process, and then Sn plating the surface of the base material 3. FIG. 3(b) is a cross sectional structure after the reflow process, and the Ni covering layer 4, Cu covering layer 5, Cu—Sn alloy covering layer 6 and reflow Sn plated layer 7a are formed. At this stage, the Cu—Sn alloy covering layer 6 is no longer exposed at the surface of the material, and neither [D1] nor [y] is 0. FIG. 3(a) is a cross sectional structure after Sn plating is subsequently performed, in which the uniform Sn plated layer 7b is formed, and the Sn plated layer 7b constitutes the Sn covering layer 7 together with the reflow Sn plated layer 7a.

Figure 4A:
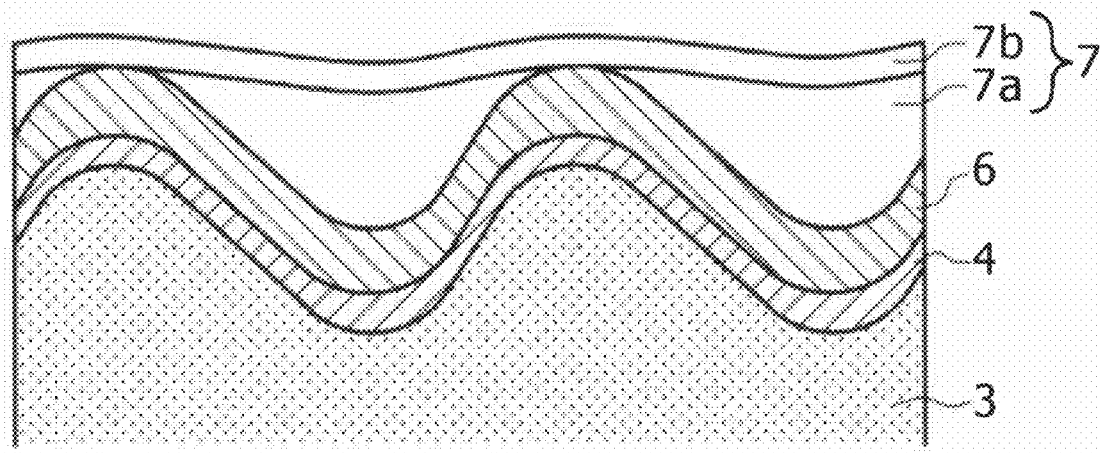
FIG. 4 is a drawing which schematically shows another structure of the respective covering layer appearing in a cross section perpendicular to the surface of the material.
Figure 4B:
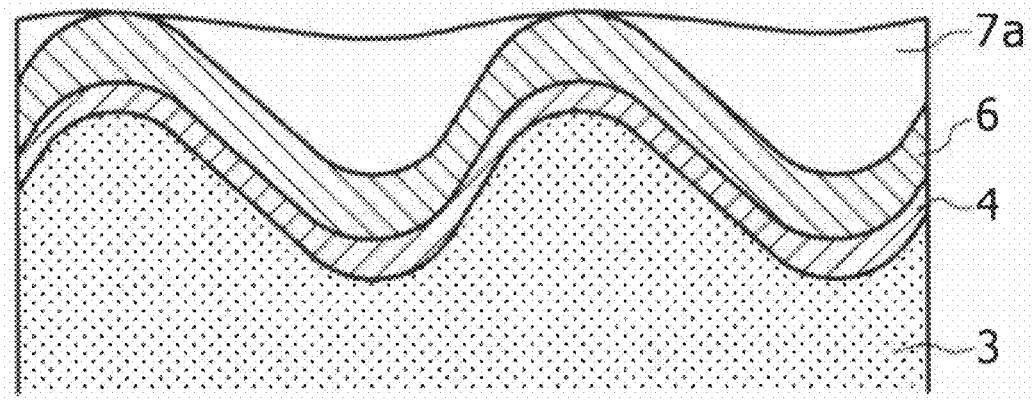

FIG. 4 is a conductive material which is produced by Ni plating, Cu plating and Sn plating the roughened surface of the base material 3, performing a reflow process, and then Sn plating the surface of the base material 3. FIG. 4(b) is a cross sectional structure after the reflow process, in which the Cu plated layer has disappeared, and the Ni covering layer 4, Cu—Sn alloy covering layer 6 and reflow Sn plated layer 7a are formed. At this stage, a portion of the Cu—Sn alloy covering layer 6 is exposed at the surface of material, and [D1] is 0, but [y] is not 0. FIG. 4(a) is a cross sectional structure after Sn plating is subsequently performed, in which the uniform Sn plated layer 7b is form, and the Sn plated layer 7b constitutes the Sn covering layer 7 together with the reflow Sn plated layer 7a. [D1] and [y] are different, and neither of them is zero.

Examples

Important points will be focused on and described in further details in Examples below, but the present invention is not limited to these Examples.

[Preparation of Test Materials]

The summary of the manufacturing processes of prepared test materials No. 1 to 35 are shown in Tables 1 and 2.

As base materials, Cu alloy plates containing 1.8% by mass of Ni, 0.40% by mass of Si, 0.10% by mass of Sn, and 1.1% by mass of Zn in Cu were subjected to a surface-roughening process by using (or without using) a work roll whose surface was roughened by the shot blast or like means in rolling, giving base materials having a Vickers hardness of 200, a thickness of 0.25 mm, and different surface roughnesses. As for the roughness of the surfaces of the base materials, the test materials Nos. 1 to 26, 28 and 29 fall within the desirable range which is described in the paragraph "Best Mode for Carrying out the Invention" in terms of Ra, Sm and Ry. Although the test material No. 27 falls within the described desirable range in terms of Ra and Sm, Ry thereof is lower than the lower limit value, while the conventional test materials Nos. 30 to 35 fall below the described desirable lower limit value in terms of Ra and Ry.

Subsequently, the surfaces of the base materials of the test materials No. 1 to 18 and 23 to 35 were subjected (or not subjected) to Ni plating and were subjected (or not subjected) to Cu plating. The surfaces were then subjected to semi-bright Sn plating and to a reflow process (the Sn plated layer was fused in a heating furnace and water-cooled). After moisture on the surfaces was dried once, the materials were immersed (or not immersed) in the aqueous solution of ammonium bifluoride, and were subjected (or not subjected) to semi-bright Sn plating again. The test materials Nos. 19 to 22 were subjected to bright Sn plating after the reflow process without drying moisture on their surfaces.

TABLE 1

| Test material No. | Summary of manufacturing process of test materials | Remarks |
| --- | --- | --- |
| 1 | Base material ⇒Surface-roughening process ⇒Ni plating ⇒Cu plating ⇒Semi-bright Sn plating ⇒Reflow process | |
| 2 | Base material ⇒Surface-roughening process ⇒Ni plating ⇒Cu plating ⇒Semi-bright Sn plating ⇒Reflow process ⇒Ammonium hydrogen fluoride solution immersion process ⇒Semi-bright Sn plating | Example of present invention |

TABLE 1-continued

| Test material No. | Summary of manufacturing process of test materials | Remarks |
|---|---|---|
| 3 | Base material ⇒Surface-roughening process ⇒Ni plating ⇒Cu plating ⇒Semi-bright Sn plating ⇒Reflow process | |
| 4 | Base material ⇒Surface-roughening process ⇒Ni plating ⇒Cu plating ⇒Semi-bright Sn plating ⇒Reflow process ⇒Ammonium hydrogen fluoride solution immersion process ⇒Semi-bright Sn plating | Example of present invention |
| 5 | Base material ⇒Surface-roughening process ⇒Ni plating ⇒Cu plating ⇒Semi-bright Sn plating ⇒Reflow process | |
| 6 | Base material ⇒Surface-roughening process ⇒Ni plating ⇒Cu plating ⇒Semi-bright Sn plating ⇒Reflow process ⇒Ammonium hydrogen fluoride solution immersion process ⇒Semi-bright Sn plating | Example of present invention |
| 7 | Base material ⇒Surface-roughening process ⇒Ni plating ⇒Cu plating ⇒Semi-bright Sn plating ⇒Reflow process | |
| 8 | Base material ⇒Surface-roughening process ⇒Ni plating ⇒Cu plating ⇒Semi-bright Sn plating ⇒Reflow process ⇒Ammonium hydrogen fluoride solution immersion process ⇒Semi-bright Sn plating | Example of present invention |
| 9 | Base material ⇒Surface-roughening process ⇒Ni plating ⇒Cu plating ⇒Semi-bright Sn plating ⇒Reflow process | |
| 10 | Base material ⇒Surface-roughening process ⇒Ni plating ⇒Cu plating ⇒Semi-bright Sn plating ⇒Reflow process | |
| 11 | Base material ⇒Surface-roughening process ⇒Ni plating ⇒Cu plating ⇒Semi-bright Sn plating ⇒Reflow process | |
| 12 | Base material ⇒Surface-roughening process ⇒Ni plating ⇒Cu plating ⇒Semi-bright Sn plating ⇒Reflow process | |
| 13 | Base material ⇒Surface-roughening process ⇒Ni plating ⇒Cu plating ⇒Semi-bright Sn plating ⇒Reflow process | |
| 14 | Base material ⇒Surface-roughening process ⇒Ni plating ⇒Cu plating ⇒Semi-bright Sn plating ⇒Reflow process | |
| 15 | Base material ⇒Surface-roughening process ⇒Ni plating ⇒Cu plating ⇒Semi-bright Sn plating ⇒Reflow process | |
| 16 | Base material ⇒Surface-roughening process ⇒ ⇒ ⇒Semi-bright Sn plating ⇒Reflow process ⇒Ammonium hydrogen fluoride solution immersion process ⇒Semi-bright Sn plating | Example of present invention |
| 17 | Base material ⇒Surface-roughening process ⇒ ⇒Cu plating ⇒Semi-bright Sn plating ⇒Reflow process ⇒Ammonium hydrogen fluoride solution immersion process ⇒Semi-bright Sn plating | Example of present invention |
| 18 | Base material ⇒Surface-roughening process ⇒Ni plating ⇒Cu plating ⇒Semi-bright Sn plating ⇒Reflow process | |
| 19 | Base material ⇒Surface-roughening process ⇒Ni plating ⇒Cu plating ⇒Semi-bright Sn plating ⇒Reflow process ⇒ ⇒bright Sn plating | Example of present invention |
| 20 | Base material ⇒Surface-roughening process ⇒Ni plating ⇒Cu plating ⇒Semi-bright Sn plating ⇒Reflow process ⇒ ⇒bright Sn plating | Example of present invention |
| 21 | Base material ⇒Surface-roughening process ⇒Ni plating ⇒Cu plating ⇒Semi-bright Sn plating ⇒Reflow process ⇒ ⇒bright Sn plating | Example of present invention |
| 22 | Base material ⇒Surface-roughening process ⇒Ni plating ⇒Cu plating ⇒Semi-bright Sn plating ⇒Reflow process ⇒ ⇒bright Sn plating | Example of present invention |

TABLE 2

| Test material No. | Summary of manufacturing process of test materials | Remarks |
|---|---|---|
| 23 | Base material ⇒Surface-roughening process ⇒Ni plating ⇒Cu plating ⇒Semi-bright Sn plating ⇒Reflow process ⇒Ammonium hydrogen fluoride solution immersion process ⇒Semi-bright Sn plating | |
| 24 | Base material ⇒Surface-roughening process ⇒Ni plating ⇒Cu plating ⇒Semi-bright Sn plating ⇒Reflow process | |
| 25 | Base material ⇒Surface-roughening process ⇒Ni plating ⇒ ⇒Semi-bright Sn plating ⇒Reflow process ⇒Ammonium hydrogen fluoride solution immersion process ⇒Semi-bright Sn plating | |
| 26 | Base material ⇒Surface-roughening process ⇒Ni plating ⇒Cu plating ⇒Semi-bright Sn plating ⇒Reflow process ⇒Ammonium hydrogen fluoride solution immersion process ⇒Semi-bright Sn plating | |
| 27 | Base material ⇒Surface-roughening process ⇒Ni plating ⇒Cu plating ⇒Semi-bright Sn plating ⇒Reflow process | |
| 28 | Base material ⇒Surface-roughening process ⇒ ⇒ ⇒Semi-bright Sn plating ⇒Reflow process | |
| 29 | Base material ⇒Surface-roughening process ⇒Ni plating ⇒Cu plating ⇒Semi-bright Sn plating ⇒Reflow process ⇒Ammonium hydrogen fluoride solution immersion process ⇒Semi-bright Sn plating | |
| 30 | Base material ⇒ ⇒ ⇒Cu plating ⇒Semi-bright Sn plating ⇒Reflow process | Conventional example |
| 31 | Base material ⇒ ⇒Ni plating ⇒Cu plating ⇒Semi-bright Sn plating ⇒Reflow process | Conventional example |
| 32 | Base material ⇒ ⇒ ⇒ ⇒Semi-bright Sn plating ⇒Reflow process | Conventional example |
| 33 | Base material ⇒ ⇒Ni plating ⇒Cu plating ⇒Semi-bright Sn plating ⇒Reflow process | Conventional example |

TABLE 2-continued

| Test material No. | Summary of manufacturing process of test materials | Remarks |
|---|---|---|
| 34 | Base material ⇒ ⇒Ni plating ⇒Cu plating ⇒Semi-bright Sn plating ⇒Reflow process | Conventional example |
| 35 | Base material ⇒ ⇒ ⇒Cu plating ⇒Semi-bright Sn plating ⇒Reflow process | Conventional example |

The average thickness of Ni covering layers, Cu covering layers and Cu—Sn alloy covering layers of the prepared test materials, and the forms of covering layers ([D1], [D2], [y]) in perpendicular cross sections of the materials were determined in the following manners: The results are shown in Tables 3 and 4. Moreover, for reference purposes, covering layer forms ([D3], [D4] described below) were determined on the surfaces of the materials in the manner described below, and are also shown in Tables 3 and 4.

[Method for Measuring Average Thickness of Ni Covering Layer, Cu Covering Layer and Cu—Sn Alloy Covering Layer]

Cross sections of the test materials processed by the microtome method were subjected to argon ion etching, if necessary, and were observed by using SEM (scanning electron microscope) on which an EDX (energy dispersive X-ray spectrometer) was mounted. The average thicknesses of Ni covering layers, Cu covering layers and Cu—Sn alloy covering layers were respectively calculated from the shading of the obtained composition image (excluding the contrast of dirt, scratch, etc.) by image analysis process. The measured cross sections were perpendicular cross sections perpendicular to the rolling direction in the surface-roughening process.

[Method for Measuring Forms of Cross Sections Perpendicular to Surfaces of Materials]

Cross sections of the test materials processed by the microtome method were subjected to argon ion etching, if necessary, and were observed by using an SEM (scanning electron microscope) on which an EDX (energy dispersive X-ray spectrometer) was mounted. [D1], [D2] and [y] were respectively calculated from the shading of the obtained composition image (excluding the contrast of dirt, scratch, etc.) by image analysis process. The measured cross sections were perpendicular cross sections perpendicular to the rolling direction in the surface-roughening process.

Figure 5:
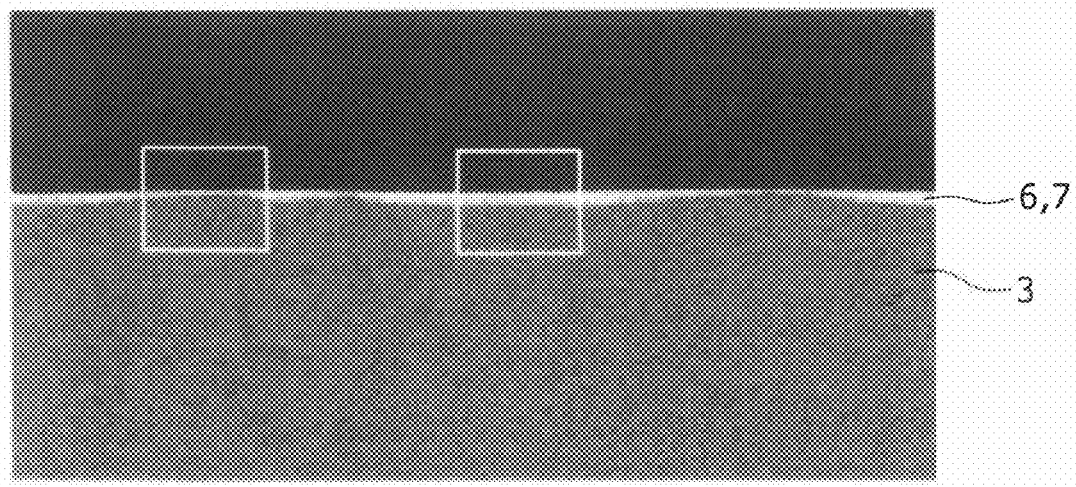
FIG. 5 is an SEM composition image which shows the structure of the covering layers appearing in a cross section perpendicular to the surface of the material with regard to the test materials No. 1.
Figure 6:
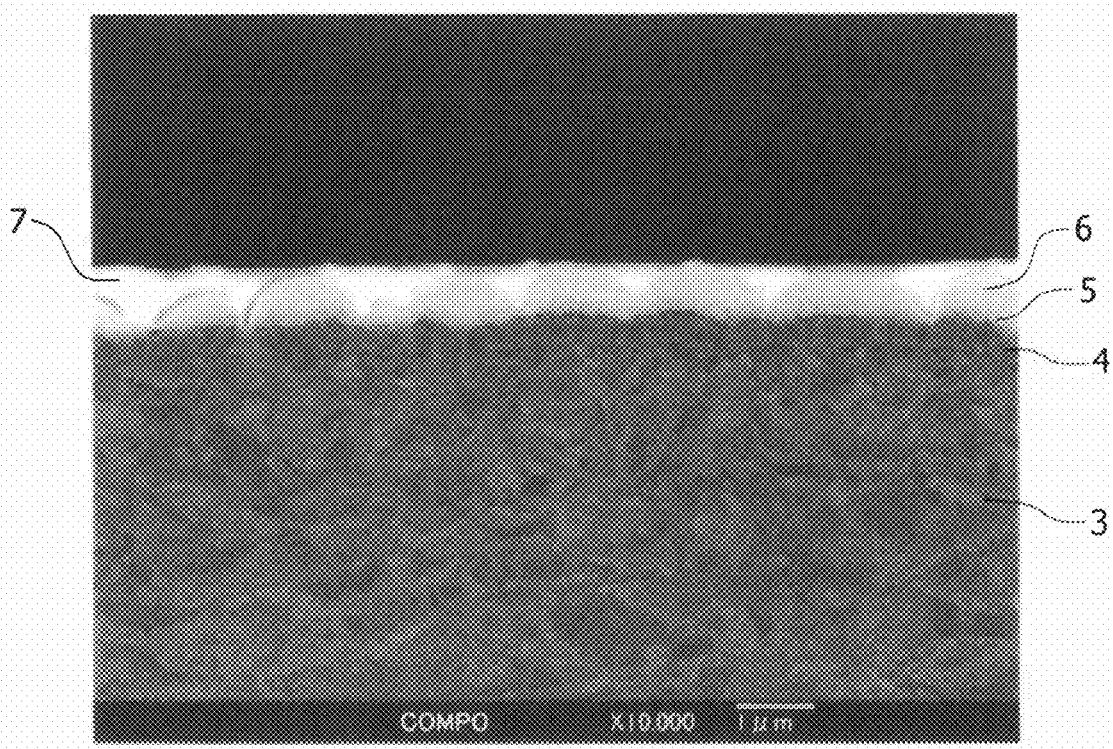
FIG. 6 is an SEM composition image which is an expanded image of a portion of FIG. 5 (the portion inside the left square)
Figure 7:
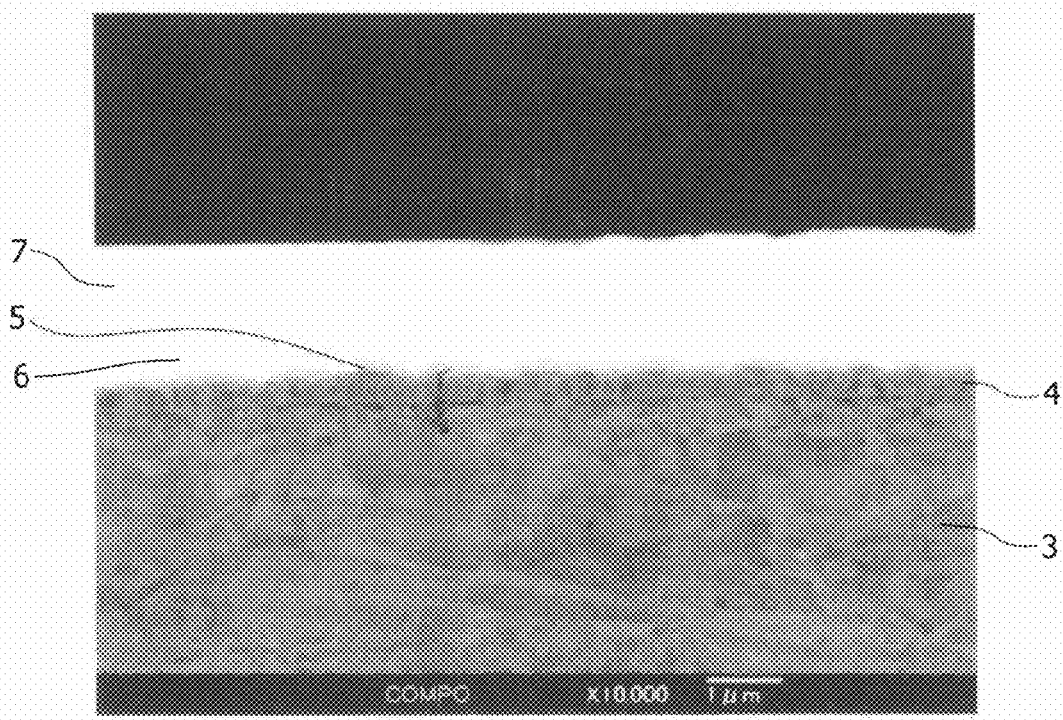
FIG. 7 is an SEM composition image which is expanded image of a portion of FIG. 5 (the portion inside the right square)

The SEM composition image of the cross section of the test materials No. 1 is shown in FIGS. 5 to 7. An expanded view of the left square portion in FIG. 5 is FIG. 6, and an expanded view of the right square portion is FIG. 7. The numeral 3 covering layer; and 7 represents an Sn covering layer (reflow Sn plated layer 7a). In FIG. 5, the whitish portion is the Sn covering layer 7 and the Cu—Sn alloy covering layer 6. The surface of the material is almost flat due to the reflow process, and the thickness of the Sn covering layer 7 varies according to the unevenness on the surface of the base material 3. In FIG. 6, a small amount of the Cu covering layer 5 remains on the surface of the Ni covering layer 4, and curved tips of grains constituting the grayish Cu—Sn alloy covering layer 6 and having a diameter of about 1 to a few μm are exposed at the whitish surface of the Sn covering layer 7. In FIG. 7, a small amount of the Cu covering layer 5 remains on the surface of the Ni covering layer 4, and the whitish Sn covering layer 7 is covering the grains of the grayish Cu—Sn alloy covering layer 6 entirely.

Figure 8:
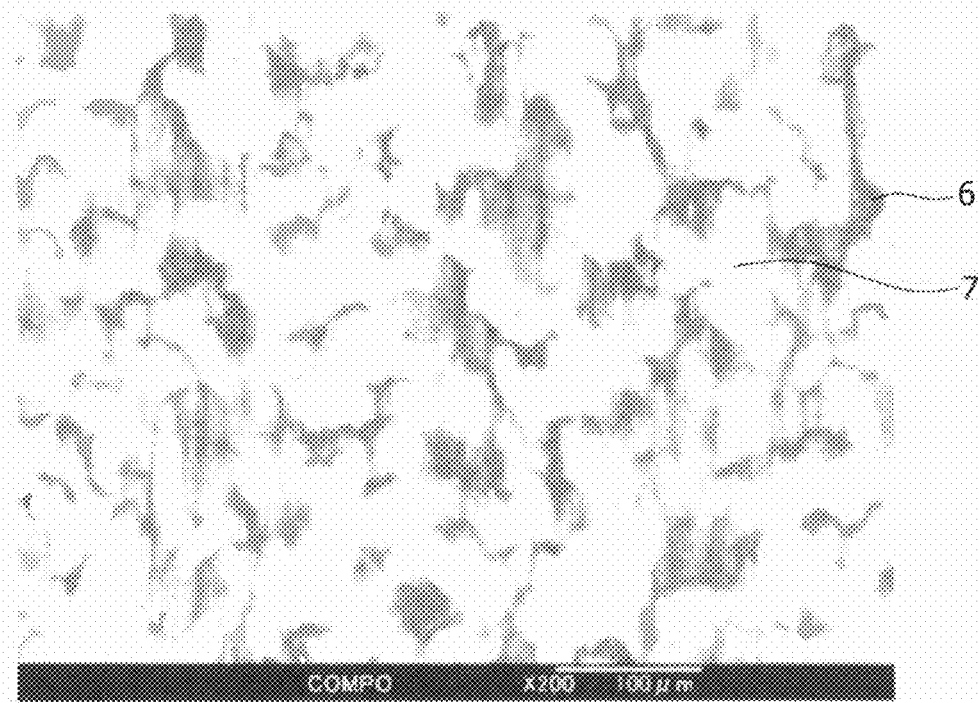
FIG. 8 is an SEM composition image which shows the structure of the covering layers appearing on the surface of the material with regard to the test material No. 1.

In FIG. 8, an SEM composition image obtained by observing the surface of the test material No. 1 by an SEM (scanning electron microscope) having an EDX (energy dispersive X-ray spectrometer) mounted thereon is shown. In the FIG., the white portion is the Sn covering layer 7 (reflow Sn plated layer 7a), and the black portion is the Cu—Sn alloy covering layer 6 exposed at the surface of the Sn covering layer 7.

In case of Examples of the present invention (the test materials No. 2, etc.), the materials are such that Sn plating are further applied on the surface of the test materials No. 1, and the Sn covering layers further contain semi-bright tin electroplating layers. Therefore, the Cu—Sn alloy covering layers are not exposed at the surface of the materials (refer to FIG. 2).

In each of Examples of the present invention, bright or semi-bright plating was performed after the reflow process. Therefore, the value of [D1] can be regarded as the thickness of the bright or semi-bright plated layer.

Moreover, in each of Examples of the present invention, the value of [D2] is a value for the Sn covering layer which is the reflow Sn plated layer and the bright or semi-bright tin electroplating layer combined together.

[Method for Measuring Forms of Material Surfaces]

The surfaces of the test materials were observed by using an SEM (scanning electron microscope) having an EDX (energy dispersive X-ray spectrometer) mounted thereon. The diameter [D3] of the maximum inscribed circle of the Cu—Sn alloy covering layer and the diameter [D4] of the maximum inscribed circle of the Sn covering layer were respectively calculated by an image analysis process from the shading of the obtained composition images (excluding the contrast of dirt, scratch, etc.). [D3] and [D4] represent the forms of exposure of the Cu—Sn alloy covering layer on the surfaces of the materials.

Figure 1B:
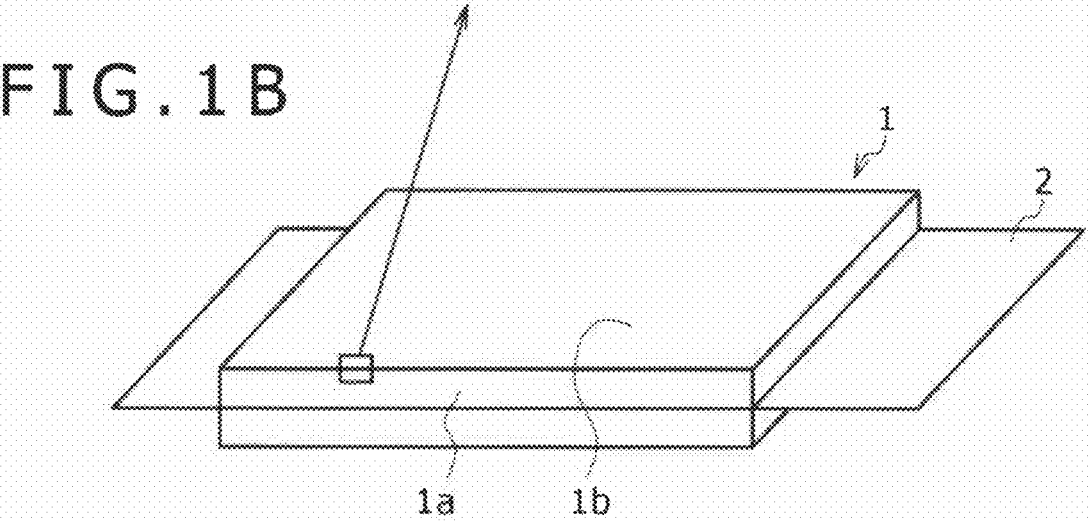
Figure 9:
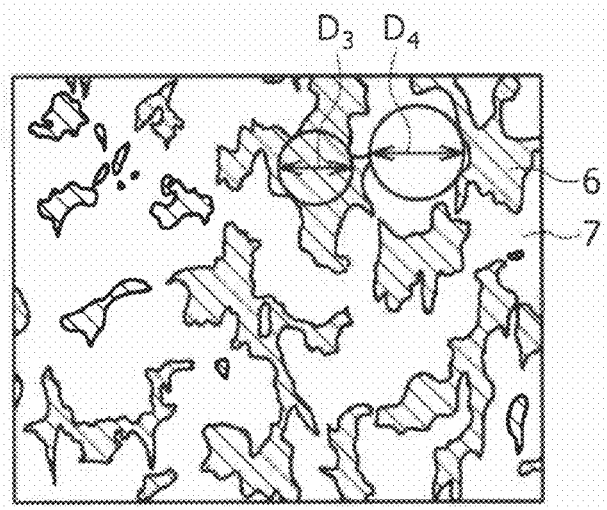
FIG. 9 is a drawing which schematically shows the structure of the covering layers appearing on the surface of the material.

When part of the Cu—Sn alloy covering layer 6 is exposed at the surface of the material 1 in the perpendicular cross section 1a of the material 1 (refer to FIG. 1(b)), (that is, when [D1] is 0 μm), [D3] and [D4] can be measured on the surface of the material 1. [D3] and [D4] are illustrated in FIG. 9. FIG. 9 schematically shows the surface of the material 1, in which the surface is constituted of the Cu—Sn alloy covering layer 6 and the Sn covering layer 7. [D3] is the diameter of the maximum inscribed circle surrounded by the Sn covering layer 7 in FIG. 9, and [D4] is the diameter of the maximum inscribed circle surrounded by the Cu—Sn alloy covering layer 6.

TABLE 3

| | Constitution of each covering layer | | | Form of cross section perpendicular to surface of material | | | Form of material on surface | | |
|---|---|---|---|---|---|---|---|---|---|
| Test material No. | Average thickness of Ni covering layer (μm) | Average thickness of Cu covering layer (μm) | Average thickness of Cu—Sn alloy covering layer (μm) | Diameter of minimum inscribed circle of Sn covering layer: [D1] (μm) | Diameter of maximum inscribed circle of Sn covering layer: [D2] (μm) | Difference in elevation between outermost point of material and outermost point of Cu—Sn alloy covering layer: [y] (μm) | Diameter of maximum inscribed circle of Cu—Sn alloy covering layer [D3] (μm) | Diameter of maximum inscribed circle of Sn covering layer [D4] (μm) | Remarks |
| 1 | 0.50 | 0.05 | 0.70 | 0 | 2.3 | 0 | 40 | 80 | |
| 2 | 0.50 | 0.15 | 0.65 | 0.10 | 2.4 | 0.10 | | | Example of present invention |
| 3 | 0.15 | 0.20 | 0.75 | 0 | 2.6 | 0 | 60 | 80 | |
| 4 | 2.6 | 0.20 | 0.75 | 0.10 | 2.7 | 0.10 | | | Example of present invention |
| 5 | 0.30 | 0.85 | 0.50 | 0 | 2.0 | 0 | 30 | 30 | |
| 6 | 1.0 | 0 | 0.25 | 0.05 | 4.2 | 0.05 | | | Example of present invention |
| 7 | 2.0 | 0.40 | 2.8 | 0 | 3.2 | 0 | 25 | 110 | |
| 8 | 1.0 | 0 | 0.50 | 0.15 | 2.1 | 0.15 | | | Example of present invention |
| 9 | 1.0 | 0.10 | 1.0 | 0 | 1.6 | 0 | 50 | 100 | |
| 10 | 1.0 | 0.25 | 1.5 | 0 | 18.5 | 0 | 5 | 190 | |
| 11 | 0.20 | 0 | 2.2 | 0 | 1.8 | 0.15 | 110 | 165 | |
| 12 | 0.50 | 0.30 | 0.70 | 0 | 2.6 | 0 | 180 | 70 | |
| 13 | 0.50 | 0 | 0.70 | 0 | 3.5 | 0 | 35 | 325 | |
| 14 | 0.50 | 0.10 | 0.70 | 0 | 3.0 | 0 | 160 | 310 | |
| 15 | 0.03 | 0.10 | 0.75 | 0 | 2.1 | 0 | 45 | 85 | |
| 16 | 0 | 0 | 2.5 | 0.10 | 2.9 | 0.10 | | | Example of present invention |
| 17 | 0 | 0.05 | 0.85 | 0.15 | 2.7 | 0.15 | | | Example of present invention |
| 18 | 0.03 | 0.10 | 0.75 | 0.10 | 2.1 | 0.10 | | | |
| 19 | 0.40 | 0.10 | 0.60 | 0.10 | 2.2 | 0.10 | | | Example of present invention |
| 20 | 2.3 | 0.25 | 0.70 | 0.10 | 2.5 | 0.10 | | | Example of present invention |
| 21 | 0.5 | 0 | 0.30 | 0.05 | 4.0 | 0.05 | | | Example of present invention |
| 22 | 1.0 | 0 | 0.80 | 0.15 | 1.5 | 0.15 | | | Example of present invention |

TABLE 4

| | Constitution of each covering layer | | | Form of cross section perpendicular to surface of material | | | material on the surface form | | |
|---|---|---|---|---|---|---|---|---|---|
| Test material No. | Average thickness of Ni covering layer (μm) | Average thickness of Cu covering layer (μm) | Average thickness of Cu—Sn alloy covering layer (μm) | Diameter of minimum inscribed circle of Sn covering layer: [D1] (μm) | Diameter of maximum inscribed circle of Sn covering layer: [D2] (μm) | Difference in elevation between outermost point of material and outermost point of Cu—Sn alloy covering layer: [y] (μm) | Diameter of maximum inscribed circle of Cu—Sn alloy covering layer [D3] (μm) | Diameter of maximum inscribed circle of Sn covering layer [D4] (μm) | Remarks |
| 23 | 0.50 | 1.2 | 0.60 | 0.10 | 2.5 | 0.10 | | | |
| 24 | 0.50 | 0.30 | 0.15 | 0 | 2.2 | 0 | 25 | 140 | |
| 25 | 0.25 | 0 | 0.3(Ni—Sn) | 0.10 | 2.7 | 0.10 | | | |
| 26 | 0.50 | 0 | 0.80 | 0.35 | 3.0 | 0.35 | | | |
| 27 | 0.50 | 0.10 | 0.70 | 0 | 0.7 | 0 | 75 | 80 | |
| 28 | 0 | 0 | 0.85 | 0.10 | 1.6 | 0.80 | | | |
| 29 | 0.30 | 0 | 1.40 | 0.15 | 3.4 | 0.40 | | | |
| 30 | 0 | 0 | 2.5 | 0 | 0 | 0 | | | Conventional example |
| 31 | 0.20 | 0 | 1.8 | 0 | 0.20 | 0 | 135 | 5 | Conventional example |
| 32 | 0 | 0 | 1.10 | 0 | 4.4 | 4.4 | 20 | 110 | Conventional example |
| 33 | 0.50 | 0 | 0.70 | 0.60 | 0.80 | 0.60 | | | Conventional example |

TABLE 4-continued

| | Constitution of each covering layer | | | Form of cross section perpendicular to surface of material | | | | | |
|---|---|---|---|---|---|---|---|---|---|
| | | | | Diameter | Diameter | Difference in elevation between outermost point | material on the surface form | | |
| | Average | | Average | of minimum | of maximum | of material | | | |
| Test material No. | thickness of Ni covering layer (μm) | Average thickness of Cu covering layer (μm) | thickness of Cu—Sn alloy covering layer (μm) | inscribed circle of Sn covering layer: [D1] (μm) | inscribed circle of Sn covering layer: [D2] (μm) | and outermost point of Cu—Sn alloy covering layer: [y(μm)] | Diameter of maximum inscribed circle of Cu—Sn alloy covering layer [D3] (μm) | Diameter of maximum inscribed circle of Sn covering layer [D4] (μm) | Remarks |
| 34 | 0.50 | 0 | 0.70 | 0.15 | 0.40 | 0.15 | | | Conventional example |
| 35 | 0 | 0 | 0.75 | 0.55 | 0.85 | 0.55 | | | Conventional example |

Moreover, the obtained test materials were subjected to friction coefficient evaluation test, contact resistance evaluation test during slight-sliding abrasion test, contact resistance evaluation test after being left at a high temperature, thermal peeling resistance test, contact resistance evaluation test and lead-free solder wettability test after sulfurous acid gas corrosion test, and lead-free solder wettability test in the manners described below. The results are shown in Tables 5 and 6.

[Friction Coefficient Evaluation Test]

Figure 10:
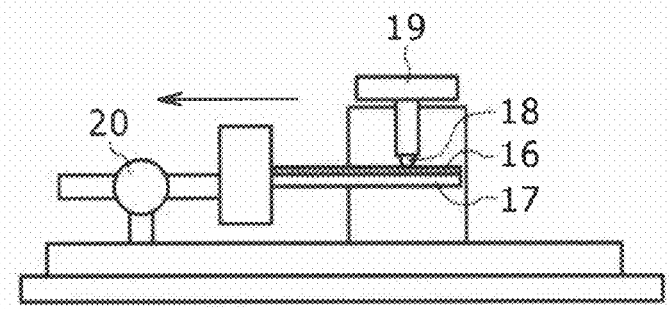
FIG. 10 is a conceptual diagram of a fixture for measuring friction coefficient.

Evaluation was made by simulating the shape of an indent of an electrical contact in a fitting type connecting part with the use of an apparatus as shown in FIG. 10. First, a male specimen 11 prepared from a sheet material cut out from the respective test materials No. 1 to 35 was fixedly attached to a horizontal platform 12, and on the top of the male specimen 11, a female specimen 13 prepared from a hemisphere-shaped workpiece (φ1.5 mm in inside diameter) cut out from the test piece No. 35 was placed so that respective covering layers of both the specimens were brought into contact with each other. Subsequently, a load (weight 14) of 3.0 N was imposed on the female specimen 13 to press down the male specimen 11, and the male specimen 11 was pulled in the horizontal direction (sliding rate at 80 mm/min.) with the use of a horizontal-load measuring apparatus (model-2152 manufactured by Aiko Engineering Co., Ltd.), thereby having measured a maximum friction force F (unit: N) up to a slidable distance 5 mm. Friction coefficient was found by the following expression (1). In the figure, reference numeral 15 denotes a load cell, and an arrow denotes a slidable direction.

$$\text{Friction coefficient} = F/3.0 \qquad (1)$$

[Evaluation Test for Contact Resistance During Slight Sliding Abrasion Test]

Figure 11:
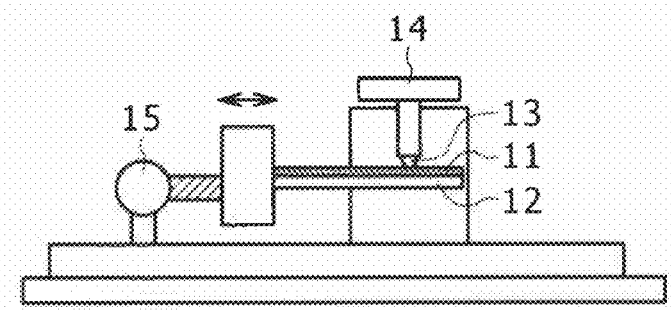
FIG. 11 is a conceptual diagram of a fixture for measuring slight sliding abrasion.

Evaluation was made by simulating the shape of the indent of the electrical contact in the fitting type connecting part with the use of a slidable tester (CRS-B1050CHO: model manufactured by Yashiki-Seiki Co., Ltd.) as shown in FIG. 11. First, a male specimen 16 prepared from a sheet material cut out from the test piece No. 35 was fixedly attached to a horizontal platform 17, and on the top of the male specimen 16, a female specimen 18 prepared from a hemisphere-shaped workpiece (φ1.5 mm in inside diameter) cut out from the respective test pieces No. 1 to 35 was placed, thereby having brought respective covering layers of both the specimens into contact with each other. Subsequently, a load (weight 19) of 2.0 N was imposed on the female specimen 18 to press down the male specimen 16, and a constant current was applied between the male specimen 16 and the female specimen 18, thereby having caused the male specimen 16 to slidably move in the horizontal direction by using a stepping motor 20 (a sliding distance: 50 μm, sliding frequency: 1.0 Hz), thereby having measured the maximum contact resistance up to 1000 in sliding frequency by the four-terminal method under the condition of an open voltage 20 mV, and current 10 mA. In the figure, arrows denote respective slidable directions.

[Evaluation Test for Contact Resistance after being Left Out at High Temperature]

Heat treatment at 175° C.×1000 hr in the air was applied to the respective test pieces cut out from the test materials Nos. 1 to 35, and subsequently, contact resistance was measured by the four-terminal method under (by sliding an Au probe horizontally, under the conditions of load of 3.0 N, sliding distance of 0.30 mm, sliding rate of 1.0 mm/min., open voltage 20 mV, and current 10 mA).

[Thermal Peeling Resistance Test]

Respective test pieces prepared from a sheet material cut out from of the respective test materials Nos. 1 to 35 were subjected to 90° bending (bending radius: 0.7 mm), and heat treatment at 175° C.×1000 hr in the air was applied thereto. The test pieces were bent back to visually evaluate the presence or absence of peeling in the covering layers.

[Contact Resistance Evaluation Test after Sulfurous Acid Gas Corrosion]

First, test pieces prepared from a sheet material cut out from the respective test materials Nos. 1 to 35 were subjected to a sulfurous acid gas corrosion test under the following conditions: sulfurous acid gas concentration: 25 ppm, temperature: 35° C., humidity: 75% RH, and time: 96 hr, and contact resistance was measured by the four-terminal method (an Au probe was caused to horizontally slide, and measurement was performed under the following conditions: load: 3.0 N, sliding distance: 0.30 mm, sliding speed: 1.0 mm/min., open voltage 20 mV, and current: 10 mA).

[Lead-Free Solder Wettability Test]

Test pieces prepared from a sheet material cut out from of the respective test materials Nos. 1 to 35 were immersed into an non-active flux for 1 second to apply the flux to the test pieces, and wetting time and maximum wetting force were measured by the meniscograph method (test pieces were immersed into a Sn-3.0 Ag-0.5 Cu solder at 255° C., and measurement was carried out under the following conditions: immersion rate: 25 mm/sec, immersion depth: 12 mm, and immersion time: 5.0 sec.). Moreover, the test pieces after being immersed into the above-mentioned solder were visually evaluated for the presence or absence of solder wetting failure.

TABLE 5

| Test material No. | Low insertion force property Friction coefficient | Slight sliding abrasion resistance Contact resistance during slight sliding abrasion test (mΩ) | Heat resistance | | Corrosion resistance Contact resistance after sulfurous acid gas corrosion test (mΩ) | Lead-free solder wettability | | | Remarks |
|---|---|---|---|---|---|---|---|---|---|
| | | | contact resistance after being left out at high temperature (mΩ) | Appearance after thermal peeling resistance test | | Wetting time (sec) | Maximum wetting force (mN) | Appearance after solder wetting test | |
| 1 | 0.22 | 6 | 4 | ○ | 3 | 1.6 | 9.2 | ○ | |
| 2 | 0.28 | 14 | 1 | ○ | 1 | 1.0 | 9.8 | ○ | Example of present invention |
| 3 | 0.23 | 4 | 15 | ○ | 2 | 1.9 | 8.0 | ○ | |
| 4 | 0.28 | 17 | 1 | ○ | 1 | 1.0 | 10.3 | ○ | Example of present invention |
| 5 | 0.22 | 3 | 3 | ○ | 2 | 1.5 | 8.2 | ○ | |
| 6 | 0.29 | 19 | 17 | ○ | 11 | 0.8 | 10.8 | ○ | Example of present invention |
| 7 | 0.25 | 10 | 2 | ○ | 1 | 1.0 | 10.3 | ○ | |
| 8 | 0.32 | 23 | 3 | ○ | 3 | 0.9 | 10.0 | ○ | Example of present invention |
| 9 | 0.24 | 8 | 21 | ○ | 8 | 1.8 | 8.1 | ○ | |
| 10 | 0.29 | 21 | 1 | ○ | 1 | 0.8 | 12.5 | ○ | |
| 11 | 0.31 | 23 | 16 | ○ | 10 | 1.7 | 8.1 | ○ | |
| 12 | 0.20 | 2 | 24 | ○ | 18 | 1.9 | 7.4 | ○ | |
| 13 | 0.32 | 29 | 3 | ○ | 2 | 0.9 | 10.9 | ○ | |
| 14 | 0.31 | 27 | 22 | ○ | 16 | 1.8 | 7.8 | ○ | |
| 15 | 0.23 | 7 | 88 | ○ | 46 | 3.1 | 7.8 | x | |
| 16 | 0.30 | 32 | 50 | x | 45 | 2.4 | 7.2 | ○ | Example of present invention |
| 17 | 0.28 | 35 | 62 | x | 33 | 1.9 | 7.5 | ○ | Example of present invention |
| 18 | 0.23 | 7 | 43 | ○ | 35 | 2.1 | 7.8 | ○ | |
| 19 | 0.26 | 15 | 1 | ○ | 1 | 1.1 | 9.7 | ○ | Example of present invention |
| 20 | 0.27 | 14 | 1 | ○ | 1 | 1.0 | 8.9 | ○ | Example of present invention |
| 21 | 0.22 | 20 | 15 | ○ | 10 | 0.8 | 10.3 | ○ | Example of present invention |
| 22 | 0.30 | 22 | 2 | ○ | 2 | 1.0 | 9.6 | ○ | Example of present invention |

TABLE 6

| Test material No. | Low insertion force property Friction coefficient | Slight sliding abrasion resistance Contact resistance during slight sliding abrasion test (mΩ) | Heat resistance | | Corrosion resistance Contact resistance after sulfurous acid gas corrosion test (mΩ) | Lead-free solder wettability | | | Remarks |
|---|---|---|---|---|---|---|---|---|---|
| | | | Contact resistance after being left out at high temperature (mΩ) | Appearance after thermal peeling resistance test | | Wetting time (sec) | Maximum wetting force (mN) | Appearance after solder wetting test | |
| 23 | 0.28 | 22 | 64 | x | 4 | 1.1 | 9.8 | ○ | |
| 24 | 0.27 | 17 | 112 | ○ | 70 | 1.4 | 8.6 | ○ | |
| 25 | 0.29 | 26 | >2000 | ○ | 350 | 1.0 | 9.7 | ○ | |
| 26 | 0.47 | 180 | 2 | ○ | 1 | 0.9 | 10.8 | ○ | |
| 27 | 0.23 | 4 | 52 | ○ | 45 | 2.1 | 4.8 | x | |
| 28 | 0.53 | 380 | 180 | x | 71 | 1.2 | 8.1 | ○ | |
| 29 | 0.51 | 260 | 3 | ○ | 2 | 1.3 | 9.6 | ○ | |
| 30 | 0.20 | 2 | 550 | x | 210 | >5.0 | <0.0 | x | Conventional example |
| 31 | 0.21 | 5 | 45 | ○ | 38 | >5.0 | <0.0 | x | Conventional example |
| 32 | 0.65 | 1500 | 120 | x | 65 | 3.3 | 8.2 | x | Conventional example |
| 33 | 0.52 | 210 | 2 | ○ | 1 | 1.2 | 4.6 | ○ | Conventional example |
| 34 | 0.31 | 35 | 41 | ○ | 35 | 2.4 | 3.3 | x | Conventional example |
| 35 | 0.50 | 180 | 110 | x | 65 | 1.4 | 4.7 | ○ | Conventional example |

As shown in Tables 3 and 5, the test materials Nos. 1 to 22 satisfy the specification of the present invention in terms of covering layer constitution (thickness of each covering layer, [D1], [D2] and [y]), have low friction coefficients, and show excellent characteristics in all of contact resistance during the slight sliding abrasion test, contact resistance after being left out at high temperature, appearance after thermal peeling resistance test, contact resistance after sulfurous acid gas corrosion test, and lead-free solder wettability. Since the test materials Nos. 15 to 18 have relatively small average thickness of the Ni covering layer of or less than 0.1 µm, they have relatively high contact resistance after being left out at high temperature and after sulfurous acid gas corrosion among the test materials Nos. 1 to 22, but they have better thickness of the Ni covering layer than the conventional materials of the test materials Nos. 30, 32 and 35 in which the thickness of the same layer was 0.

Among the test materials Nos. 1 to 22, the test materials Nos. 2, 4, 6, 8, 16, 17 and 19 to 22 are Examples of the present invention, which have relatively high solder wettability compared to those in which the Cu—Sn alloy layers are exposed at their surfaces.

In the test materials Nos. 23 to 29, either of the Cu covering layer and the Cu—Sn alloy covering layer does not satisfy the specification of the average thickness of the present invention, or either of [D1], [D2] and [y] does not satisfy the specification of the present invention. Accordingly, either one or a plurality of their characteristics are inferior.

The test material No. 25 is a test material prepared without applying Cu plating after Ni plating, and not the Cu—Sn alloy covering layer but the Ni—Sn alloy covering layer is formed thereon. Therefore, contact resistance after being left out at high temperature and contact resistance after sulfurous acid gas corrosion test are high.

The test materials Nos. 30 to 35 are test materials prepared without performing a roughening process, and one or two items of the specification of the present invention are not satisfied therein. Accordingly, one or more characteristics thereof are inferior.

The test material No. 30 is a test material with no Ni plating applied, in which the entire Sn covering layer has disappeared by a reflow process for a long period of time. The test material No. 31 is a test material in which most of the Sn covering layer has disappeared by a reflow process for a long period of time. The test material No. 32 has no Ni plating or Cu plating applied thereto, and the test material No. 35 has no Ni plating applied thereto.

What is claimed is:

1. A conductive material for a connecting part, comprising: a base material made up of a Cu strip;
   a Cu—Sn alloy covering layer having an average thickness of 0.2 to 3.0 µm; and
   an Sn covering layer, the Cu—Sn alloy covering layer being provided between the base material and the Sn covering layer,
   wherein in a cross section perpendicular to the surface of the conductive material, D1 is the diameter of a minimum inscribed circle of the Sn covering layer and is drawn between the surface of the Cu—Sn alloy covering layer and the outermost surface of the material; D2 is the diameter of a maximum inscribed circle of the Sn covering layer, the diameter [D1] of the minimum inscribed circle of the Sn covering layer is 0.01 to 0.2 µm, the diameter [D2] of the maximum inscribed circle of the Sn covering layer is 1.2 to 20 µm, the difference in elevation [y] between the outermost point of the material and the outermost point of the Cu—Sn alloy covering layer is 0.01 to 0.2 µm, and a bright or semi-bright tin electroplating layer having an average thickness of 0.01 µm or more in an approximately uniform thickness is formed on the outermost [layer] surface as part of the Sn covering layer.

2. A conductive material for a connecting part according to claim 1, wherein the Sn covering layer comprises a reflow Sn plated layer and the bright or semi-bright tin electroplating layer formed thereon.

3. A conductive material for a connecting part according to claim 1, wherein an Ni covering layer having an average thickness of 0.1 to 3.0 µm if formed between the surface of the base material and the Cu—Sn alloy covering layer.

4. A conductive material for a connecting part according to claim 3, wherein a Cu covering layer having an average thickness of 0.01 to 1.0 µm is formed between the Ni covering layer and the Cu—Sn alloy covering layer.

5. A conductive material for a connecting part according to claim 4, wherein the Cu covering layer has an average thickness of 0.01 to 0.5 µm.

6. A conductive material for a connecting part according to claim 3, wherein the average thickness of the Ni covering layer is 0.2 to 2.0 µm.

7. A conductive material for a connecting part according to claim 1, wherein a Cu covering layer having an average thickness of 0.01 to 1.0 µm is formed between the surface of the base material and the Cu—Sn alloy covering layer.

8. A conductive material for a connecting part according to claim 7, wherein the Cu covering layer has an average thickness of 0.01 to 0.5 µm.

9. A conductive material for a connecting part according to claim 1, wherein the Cu—Sn alloy covering layer has an average thickness of 0.3 to 3.0 µm.

10. A conductive material for a connecting part according to claim 1, wherein [D1] is 0.01 to 0.15 µm.

11. A conductive material for a connecting part according to claim 1, wherein [D2] is 1.5 to 10 µm.

12. A conductive material for a connecting part according to claim 1, wherein [y] is 0.01 to 0.15 µm.

13. A conductive material for a connecting part according to claim 1, which comprises a bright or semi-bright tin electroplating layer having a uniform thickness on the outermost [layer] surface as part of the Sn covering layer.

* * * * *